United States Patent [19]
Loveridge et al.

[11] Patent Number: 5,374,995
[45] Date of Patent: Dec. 20, 1994

[54] METHOD AND APPARATUS FOR ENHANCING SHARPNESS OF A SEQUENCE OF IMAGES SUBJECT TO CONTINUOUS ZOOM

[75] Inventors: Jennifer C. Loveridge, North Harrow; Richard A. Sharman, Dunstable, both of England

[73] Assignee: Eastman Kodak Company, Rochester, N.Y.

[21] Appl. No.: 37,651

[22] Filed: Mar. 22, 1993

[51] Int. Cl.$^5$ ............................................. H04N 1/40
[52] U.S. Cl. ........................................ 358/447; 348/240
[58] Field of Search ............... 358/447, 448, 451, 454, 358/227, 140, 180; 348/240

[56] References Cited

U.S. PATENT DOCUMENTS

| | | | |
|---|---|---|---|
| 4,970,593 | 11/1990 | Cantrell | 358/166 |
| 5,257,121 | 10/1993 | Steinberg | 358/447 |

FOREIGN PATENT DOCUMENTS

| | | |
|---|---|---|
| 0517474A2 | 9/1992 | European Pat. Off. . |
| 4010783 | 1/1992 | Japan . |
| 2158322A | 11/1985 | United Kingdom . |
| 2237161A | 4/1991 | United Kingdom . |
| 2253966A | 9/1992 | United Kingdom . |

*Primary Examiner*—Stephen Brinich
*Attorney, Agent, or Firm*—David M. Woods

[57] ABSTRACT

A bandpass enhancement filter has a pass-band that tracks changes in spatial frequency due to the use of a zooming process upon a digital image signal. The primary pass-band of the enhancement filter is derived from a combination of a plurality of secondary bandpass filter sections, each having a different frequency response and each responsive to a gain adjustment. A control signal reflecting a particular zoom ratio is used in the adjustment of the gain applied to the filter sections, thereby proportioning the output of each filter section so that the combined output tracks the zooming process.

15 Claims, 9 Drawing Sheets

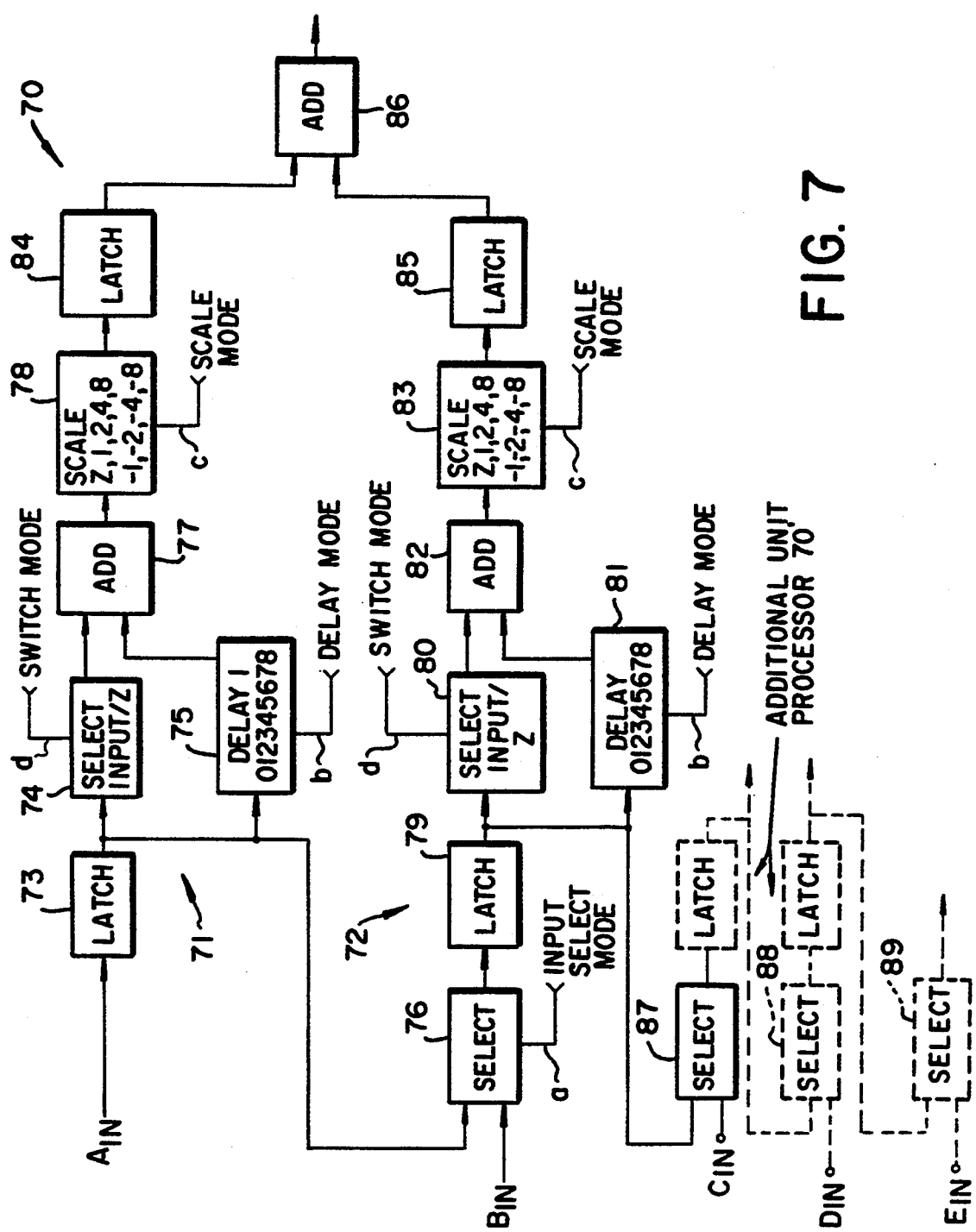

FIG. 8A

```
                        PIXEL
            | 0 |-1 |-2|-3 -4 -5 -6 -7 -8
LINE(0)     | X | X | X|
```

FIG. 8B

```
                        PIXEL
            | 0 |-1 |-2|-3 -4 -5 -6 -7 -8
LINE(0)     | X |   |  |
LINE(1)     | X |   |  |
```

FIG. 8C

```
                        PIXEL
            | 0 |-1 |-2|-3 -4 -5 -6 -7 -8
LINE(0)     | X |   | X|
LINE(1)     | X |   | X|
```

FIG. 8D

```
                     PIXEL
          0  -1 -2 -3 -4 -5 -6 -7 -8
LINE (0)  X  X  X  X  X  X  X  X  X
```

FIG. 8E

```
                     PIXEL
            0  -1 -2 -3 -4 -5 -6 -7 -8
LINE ( 0)   X           X
LINE (-1)      X     X
LINE (-2)         X
LINE (-3)      X     X
LINE (-4)   X           X
```

FIG. 8F

```
                     PIXEL
            0  -1 -2 -3 -4 -5 -6 -7 -8
LINE ( 0)
LINE (-1)      X     X
LINE (-2)         X
LINE (-3)      X     X
LINE (-4)
```

METHOD AND APPARATUS FOR ENHANCING SHARPNESS OF A SEQUENCE OF IMAGES SUBJECT TO CONTINUOUS ZOOM

FIELD OF INVENTION

This invention relates to the field of image signal processing, especially for the purpose of enhancing image features.

BACKGROUND OF THE INVENTION

The invention has particular relevance to an electronic imaging system in which the input images are either stationary images or time-varying sequences of images, and in which the output images are subject to a static or dynamic digital zoom. The static zoom effects size changes in a stationary image, and the dynamic zoom effects continuing size changes, often on a frame-to-frame basis in a video environment, on a time-varying sequence of images. The zooming process, which may be implemented in a spatial interpolator, such as described in copending Ser. No. 817,204, "Digital Image Interpolation System for Zoom and Pan Effects" by Keith R. Hailey (filed Jan. 6, 1992 in the name of the same assignee as the present invention), may be required for spatial standards conversion, or for image magnification within a given spatial standard.

The effect of zooming upon sampled image data must be carefully considered in order to avoid the problem of aliasing. As known to those skilled in this art, an image can be characterized by a two-dimensional parameter known as spatial frequency. According to the Nyquist sampling theorem, in order not to lose information contained in a signal, the signal must be sampled at a sampling frequency ($f_s$) that is equal to at least twice the bandwidth of the signal. The actual bandwidth is ordinarily established by prefiltering the analog signal before it is sampled, so that the bared edge of the signal does not exceed the upper frequency limit, which is called the Nyquist frequency, required for sampling.

In further considering the effect of zooming, it should be intuitive that, if the image is compressed, the lines appear to the viewer to become closer together, and the spatial frequency of the image is thus increased. This has the ancillary effect of increasing the upper band edge of the image's spatial frequencies. If the upper band edge now exceeds the Nyquist frequency, information is lost and aliasing results. This is handled in the prior art by inserting, before compression, a variable bandwidth digital filter that is responsive to a scaling factor representative of the degree of compression to accordingly band-limit the digital signal, and thereby to avoid any aliasing that might result from subsequent compression (see, for example, U.S. Pat. Nos. 4,760,605; 4,805,129; and 4,660,081). If the image is enlarged, so that lines appear to the viewer to become further apart, the upper spatial frequency of the image is decreased and the upper band limit is accordingly decreased. According to the prior art (e.g., the aforementioned U.S. Pat. No. 4,660,081) this is not a problem, and the variable bandwidth filters are simply disabled to provide an essentially straight through signal path.

Unlike straightforward band limiting filters, which provide a low pass function, the provision of image, or sharpness, enhancement requires digital filters having a maximum magnitude at a spatial frequency related to the output Nyquist frequency of the system. Such filters are typically one-dimensional or two-dimensional Finite Impulse Response (FIR) bandpass filters that are programmed in a variety of conventional ways to multiply a sequence of input image samples by a set of coefficients, and to provide the sum thereof as the output of the filter. The coefficients, which provide a bandpass characteristic, are generated in a conventional manner, such as an optimized frequency sampling design technique found in *Theory and Application of Digital Processing*, by L. R. Rabiner and B. Gold, Prentice-Hall: 1975, pp. 105–123. Another useful technique for generating a generalized bandpass filter is described in "Optical flow using spatio-temporal filters", by D. J. Heeger, *International Journal of Computer Vision*, 1988, pp. 279–302. The latter filter is referred to as the Gabor filter.

Enhancement is most commonly performed on an image signal after any spatial interpolation, or zooming, is done that might affect the bandwidth of the system, and after the system is accordingly band-limited to prevent aliasing, or otherwise reconverted to the original band of frequencies present before zooming. This allows one set of filters to be designed for the various spatial frequencies that are to be enhanced. However, because of signal-to-noise considerations, it is generally most beneficial to do enhancement on luminance information; likewise it is most effective to do spatial interpolation on full band color signals, rather than separately on the luminance and color/chroma information in the signal. Consequently, in applications where separate luminance and color signals are generated, it is desirable to do enhancement on the luminance signal before the luminance and color signals are processed into full band signals for spatial interpolation, that is, before zooming. Since the process of zooming affects the pass-band of the image signal spectrum, and consequently the spectrum must be band-limited to prevent aliasing, a situation arises wherein a fixed set of enhancement filters will affect different spatial frequencies as the degree of zoom is changed. For example, a bandpass enhancement filter designed to pass high band spatial frequencies without zoom will affect frequencies above the band edge after the image spectrum is compressed and band-limited. This will produce the effect of gradually diminishing enhancement as the degree of zoom is reduced, until the "enhanced spectrum" is entirely outside the band, and thus unnoticeable.

While the maximum magnitude of an enhancement filter may be correctly positioned within the Nyquist pass-band by a number of effective methods (described above), the problem remains that the enhancement filters may not be properly positioned at band edge after zooming. The aforementioned Gabor filter suggests the usefulness of a tunable peak frequency. Applying such teaching to the problem of zooming leads to several additional problems. The Gabor filter can be viewed as a sine wave multiplied by a Gaussian window in the spatial domain. The width of the filter is determined by the window, and the peak frequency by the sine waves. In order to define the peak frequency of a Gabor filter, it is necessary for the Gaussian window to envelope a significant number of sine wave cycles at the required frequency. This has two implications which become progressively more serious as the peak amplitude decreases in spatial frequency. First, the number of taps in the filter becomes unrealistic to implement in hardware. Secondly, because the width of Gaussian windows in the spatial and frequency domains are inversely proportional to each other, a Gabor filter designed to peak at low frequencies will, by definition, have a very narrow pass-band; this may not be appropriate for the application. As a result, the problem of frequency positioning of enhancement filters prior to zooming has not been effectively dealt with.

SUMMARY OF THE INVENTION

This invention overcomes the disadvantages of the prior art with a small set of fixed bandpass filters with appropriate conventional characteristics (that is, an appropriate bandwidth and stop-band performance, using a number of spatial taps which is practically realizable), which are stored within the imaging system. The bandpass filter required for enhancement at any degree of zoom may then be generated by means of an appropriate combination of the stored filters.

Accordingly, the invention provides that the pass-band of the bandpass enhancement filter tracks changes in spatial frequency due to the zooming process. More specifically, the invention provides apparatus (and a corresponding method) for enhancing the sharpness of an image signal subject to a zooming process that changes the spatial frequency of the image signal. Means are provided for generating an image signal, and for generating a control signal indicative of the amount of zoom performed on the image signal. Further means are provided for enhancing the image signal, the latter means operative within a primary pass-band derived from a plurality of different pass-bands each responsive to a gain adjustment. In response to the control signal, the gain adjustment is applied to the different pass-bands according to a predetermined relationship, whereby the primary enhancement pass-band tracks changes in the spatial frequency of the image signal due to the zooming process.

In one embodiment, the primary pass-band is derived from a predetermined combination of a plurality of secondary bandpass filter sections, each responsive to a gain adjustment. The control signal reflects the zoom ratio and is used in the adjustment of the gain applied to the filter sections to thereby arrive at the predetermined combination.

The main advantage of the invention is that the band-edge of the enhancement process is continuously positioned at the proper upper band-edge location after the interpolation section repositions the frequency response of the zoomed signal to account for aliasing. In this way the effect of enhancement is maintained throughout the zoom range, which provides a more effective utilization of the zoom feature.

BRIEF DESCRIPTION OF THE DRAWINGS

The invention will be described in relation to the drawings, wherein

FIGS. 6A–6F are timing diagrams for a 2:1 zoom;

FIG. 7 is a block diagram of a shift and add processor that may be used for the digital filters of FIG. 3; and FIGS. 8A, 8B, 8C, 8D, 8E, and 8F are examples of the pixel coverage of the filter processor of FIG. 7.

DESCRIPTION OF THE PREFERRED EMBODIMENTS

Because image processing techniques, in particular image enhancement and spatial interpolation techniques, are well known, the present description will be directed in particular to elements forming part of, or cooperating more directly with, apparatus and method in accordance with the present invention. Elements or techniques not specifically shown or described herein may be selected from those known in the art. For instance, the application of the preferred embodiment to a motion picture film scanner (i.e., a telecine machine) is shown in U.S. Pat. No. 5,045,932, "Method and Apparatus for Generating a High Definition Electronic Signal from a Line Scan of a Color Original", in the name of R. A. Sharman and R. T. Lees, which is incorporated herein by reference. In particular, the '932 patent shows the generation of a high definition television signal from the combination of a high definition detail component (a luminance signal) and a plurality of lower definition color components. Enhancement, as disclosed in the present invention, is performed on a high definition component before it is combined with any lower definition color components, and before performing spatial interpolation. The spatial interpolation may take several forms, including the example described herein in relation to FIGS. 5 and 6, or in an improved form expressed in the aforementioned Ser. No. 817,204.

Figure 1:
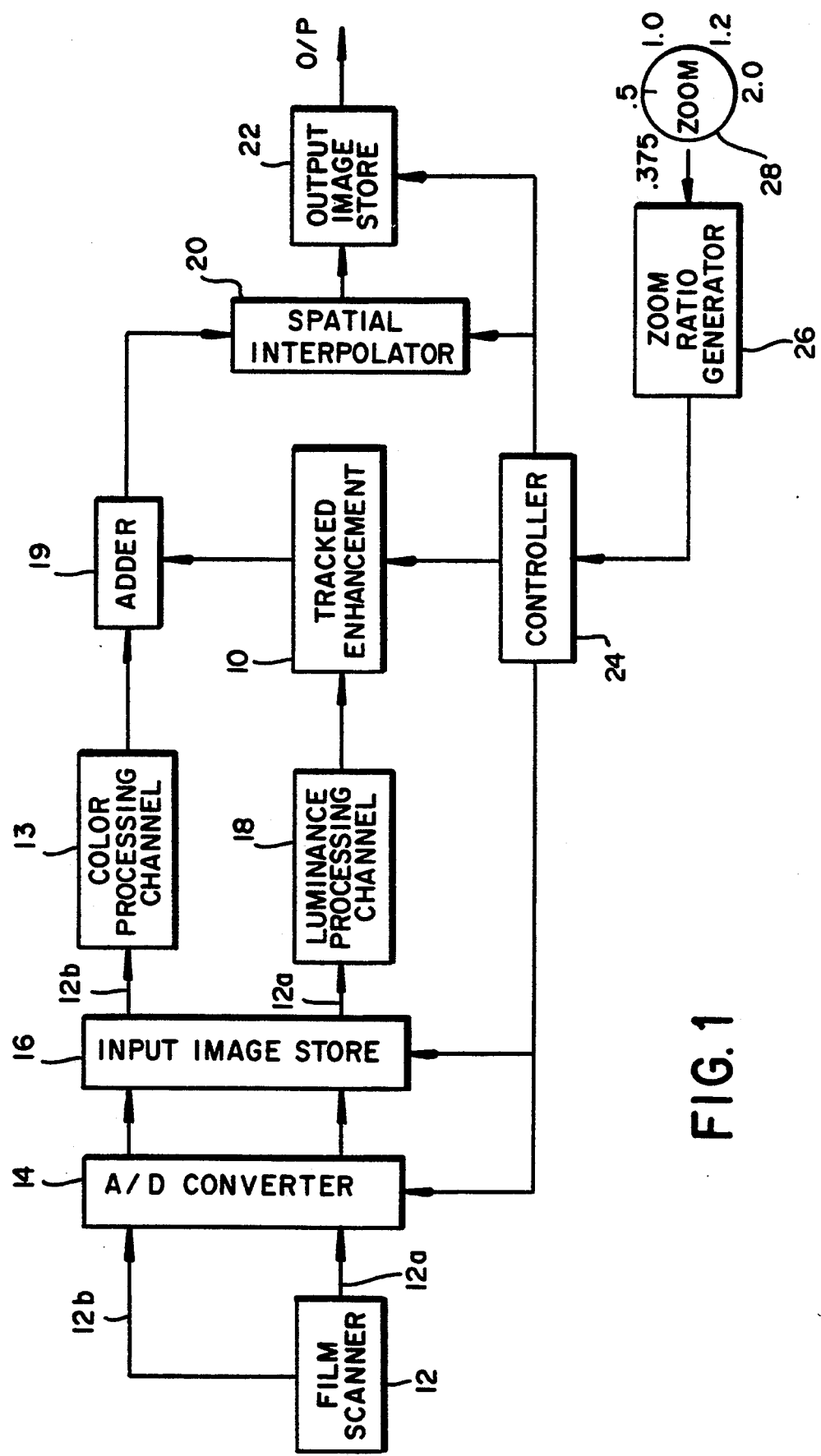
FIG. 1 is a block diagram of an image processing system incorporating a tracked enhancement section according to the invention.

FIG. 1 shows a digital image processing system incorporating a tracked enhancement section 10 in accordance with the invention. The processing system is designed for use in a telecine film scanner of the type described in U.S. Pat. No. 5,045,932, which includes a film scanner 12 for producing a high definition luminance (detail) signal 12a and a plurality 12b of low definition color signals. The film scanner 12 develops image pixel data corresponding to image pixel areas on a motion picture film. The image pixel data is processed as the luminance signal 12a and color signals 12b through an analog-to-digital converter 14 and an input image store 16. The color signals 12b are then processed in a color processing channel 13, which, as described in the aforementioned U.S. Pat. No. 5,045,932, includes color registration, and a color interpolation step. The luminance signal 12a is processed through a luminance processing channel 18, and the tracked enhancement section 10. The luminance processing channel 18, as described in the '932 patent, includes the function of detail extraction and reformatting to match the color signals. The enhanced luminance signal 12a and the color signals 12b are then combined in an adder 19 and processed through a spatial interpolator 20 and an output image store 22. A controller 24 provides system timing for pipelined operation according to the scanning speed of the film scanner 12 and the television standard in use. Film pixel data from the film scanner 12 is converted to digital pixel data by the A/D converter 14 and applied to the input image store 14 at a real-time, synchronous rate determined by the controller 24.

Figure 5:
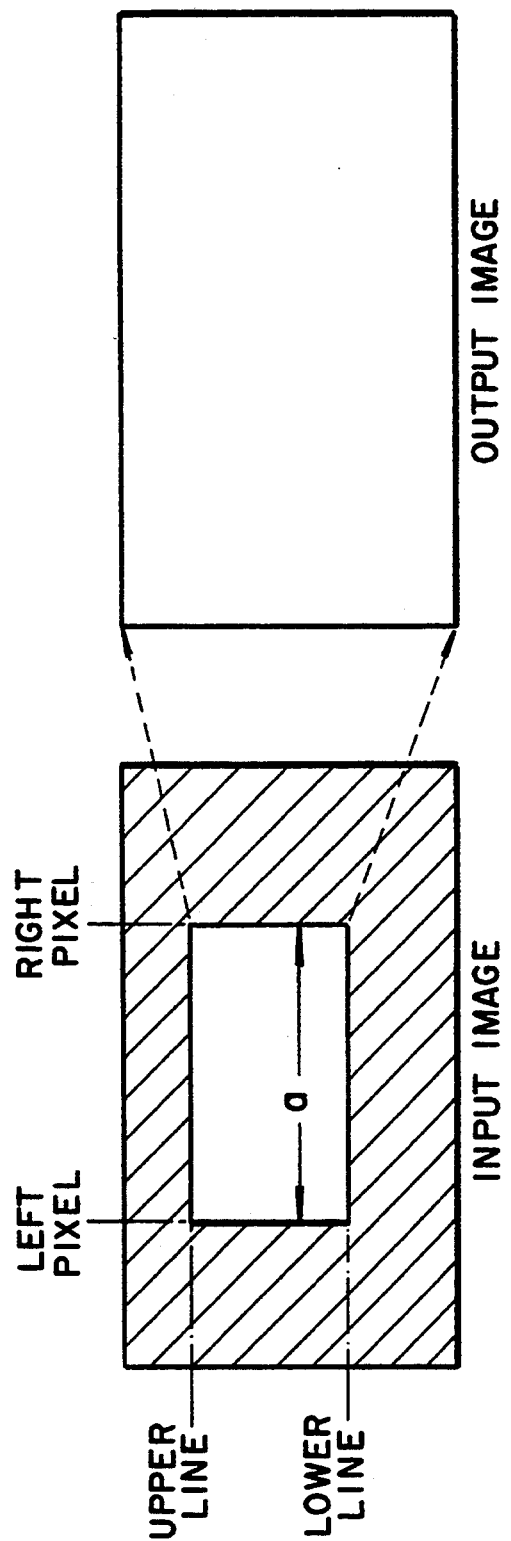
FIG. 5 is an illustration useful in understanding zoom effects in connection with an image frame.

In performing a zoom operation, a control signal is input to the controller 24 from a zoom ratio generator 26. The degree of zoom may be operator-determined, illustratively from a knob 28 connected to the zoom ratio generator 24. The zoom ratio r can be described in terms of the effect upon feature length, or in terms of overall image magnification. For instance, if a particular image feature of length n pixels input to the spatial interpolator 20 is output as an image feature of length m pixels then the zoom ratio is the quotient of m and n (i.e., r=m/n). Alternatively, the zoom ratio can be thought of as the image magnification (i.e., r=0.5 is an image reduction of 1:2, and r=2.0 is an image magnification of 2:1). To obtain a zoom, as shown in FIG. 5, a new output image is derived from the input data. In order to maintain the required data rate in numbers of lines and pixels, the new output image data is interpolated from the input data in the spatial interpolator 20. The channel data rate is maintained at the level required for pipelined operation by controlling the readout of the input image store 16. Over the active area of the zooming, lines and pixels are repeated or deleted, as necessary for optimum interpolation of the new output data.

A simple example for a 2:1 zoom ratio is given by the timing diagram of FIG. 6. Line A shows original input pixels from the portion a (see FIG. 5) of the full input image produced according to the system timing illustrated in Line C. Line B illustrates the output pixels needed (for a 2:1 zoom) from the active portion a to produce a full-sized output image (see FIG. 5). Thus, Lines A and B represent the spatial relationship between the original input and "zoomed-in" pixels, respectively. Zooming is obtained, in the luminance channel, by writing into the input store 16 at the synchronous rate represented by the Line C timing, and then controlling readout of the input store so as to repeat samples in its output. In the example of FIG. 6, this is done by advancing the read address for every other input clock, as shown by Line F, thereby repeating pixels as shown in Line D. (A similar process is provided in the color channel.) The repeated pixels are then subjected to, e.g., a linear interpolation in the spatial interpolator 20. The interpolated pixels are shown in Line E relative to the synchronous timing of Line C. In accordance with a simple linear interpolation, output (repeat) pixel B will be the average of input pixels N and N+1, (repeat) pixel D the average of input pixels N+1 and N+2, and so on. For other zoom ratios, the control pulses and repeat line/pixel sequences are more complex but the same principles apply.

Figure 2:
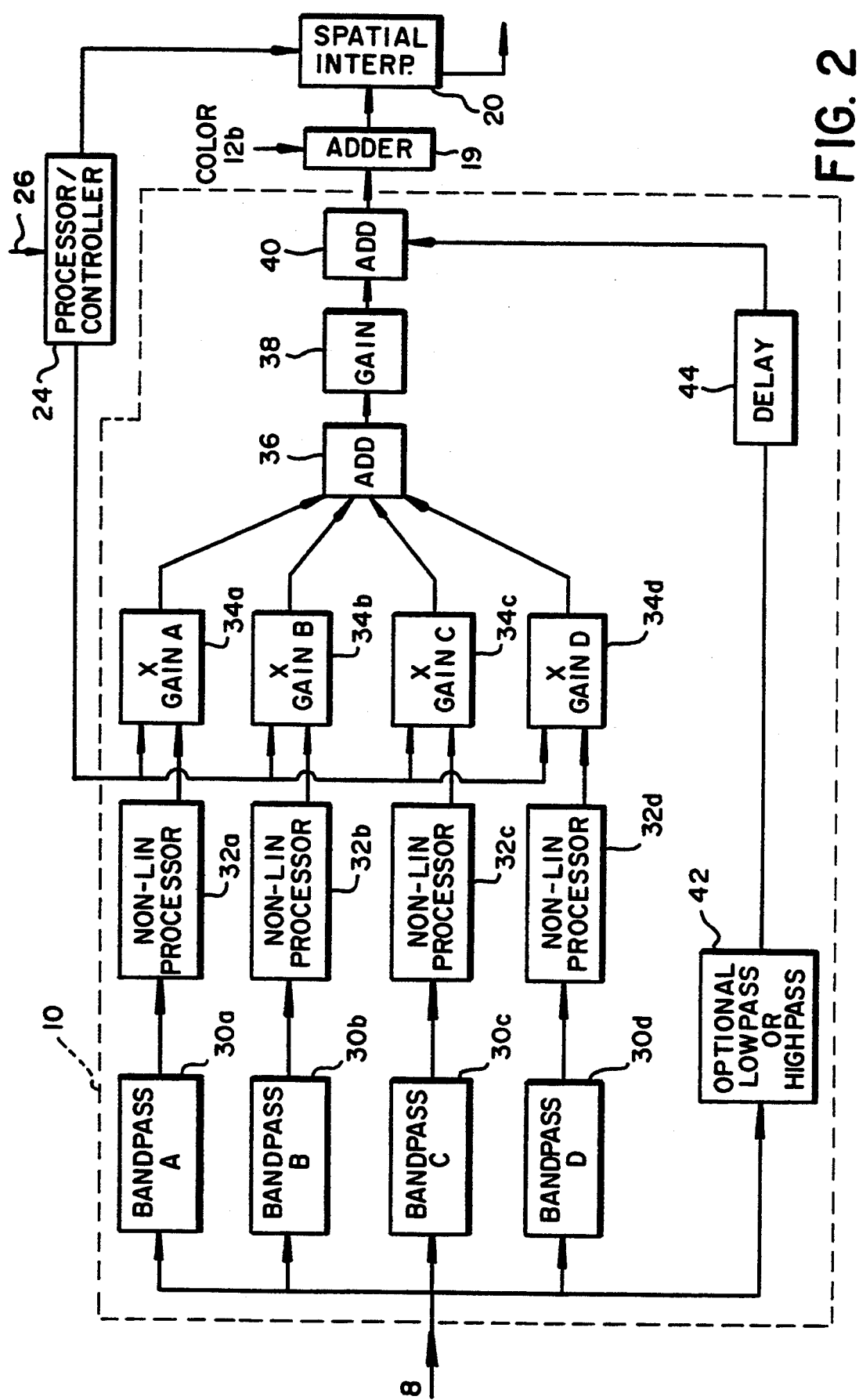
FIG. 2 is a block diagram of a first, preferred embodiment of the tracked enhancement section shown in FIG. 1.

A block diagram of a preferred implementation of the tracked enhancement filter 10 is shown in FIG. 2. The signal from the luminance processing channel 18 is applied in parallel to a bank of bandpass filter sections 30a, 30b, 30c, 30d.... Each filter section contains the digital filter coefficients for an appropriate bandpass filter characteristic, e.g., bandpass filter section 30a contains filter coefficients A, bandpass filter section 30b contains filter coefficients B, and so on. A non-linear process (thresholding) may be applied to the outputs of each of the filter sections 30a, 30b, 30c, 30d in respective nonlinear processors 32a, 32b, 32c, 32d, e.g., for the purpose of noise suppression. The thus-adjusted bandpass signals are then modified in a set of gain multipliers 34a, 34b, 34c, 32d by respective gain factors that are a predetermined function of the amount of zoom specified by the zoom ratio generator 26. The bandpass signals are then combined in an adder 36 to obtain the primary passband signal, and an overall gain factor can be applied in the gain stage 38 to tailor the overall level of sharpness enhancement in the overall pass-band. Finally, the enhanced bandpass signal could be combined with the full band signal in an adder 40, the full band signal being input to the adder 40 either directly to the adder 40 or through an optional low-pass or high-pass filter 42. (A delay to compensate for the bandpass filtering is also inserted by a delay element 44).

The preferred embodiment of the invention relates to the implementation of tracked enhancement preceding spatial interpolation in an HDTV telecine application. In this application, three two-dimensional bandpass filters are stored within the bandpass filter sections 30a, 30b, 30c, each of an 'X' shaped configuration, such that the frequency response of the filter is maximized in the horizontal and vertical orientations, and minimized diagonally. The three filters are generated using a difference-of-Gaussian approach, and hence, when added together in varying proportions produce a single filter with a smooth frequency response. In addition, the filters comprise coefficients which are powers of two and therefore may be readily implemented using digital techniques. The filter coefficients are as follows:

| Filter 'A' (3 × 3) | −8 | 0 | −8 | | | | | (1) |
|---|---|---|---|---|---|---|---|---|
| | 0 | 32 | 0 | | | | | |
| | −8 | 0 | −8 | | | | | |
| Filter 'B' (5 × 5) | −2 | 0 | 0 | 0 | −2 | | | (2) |
| | 0 | 0 | 0 | 0 | 0 | | | |
| | 0 | 0 | 8 | 0 | 0 | | | |
| | 0 | 0 | 0 | 0 | 0 | | | |
| | −2 | 0 | 0 | 0 | −2 | | | |
| Filter 'C' (7 × 7) | −1 | 0 | 0 | 0 | 0 | 0 | −1 | (3) |
| | 0 | −1 | 0 | 0 | 0 | −1 | 0 | |
| | 0 | 0 | 1 | 0 | 1 | 0 | 0 | |
| | 0 | 0 | 0 | 4 | 0 | 0 | 0 | |
| | 0 | 0 | 1 | 0 | 1 | 0 | 0 | |
| | 0 | −1 | 0 | 0 | 0 | −1 | 0 | |
| | −1 | 0 | 0 | 0 | 0 | 0 | −1 | |

Figure 3:
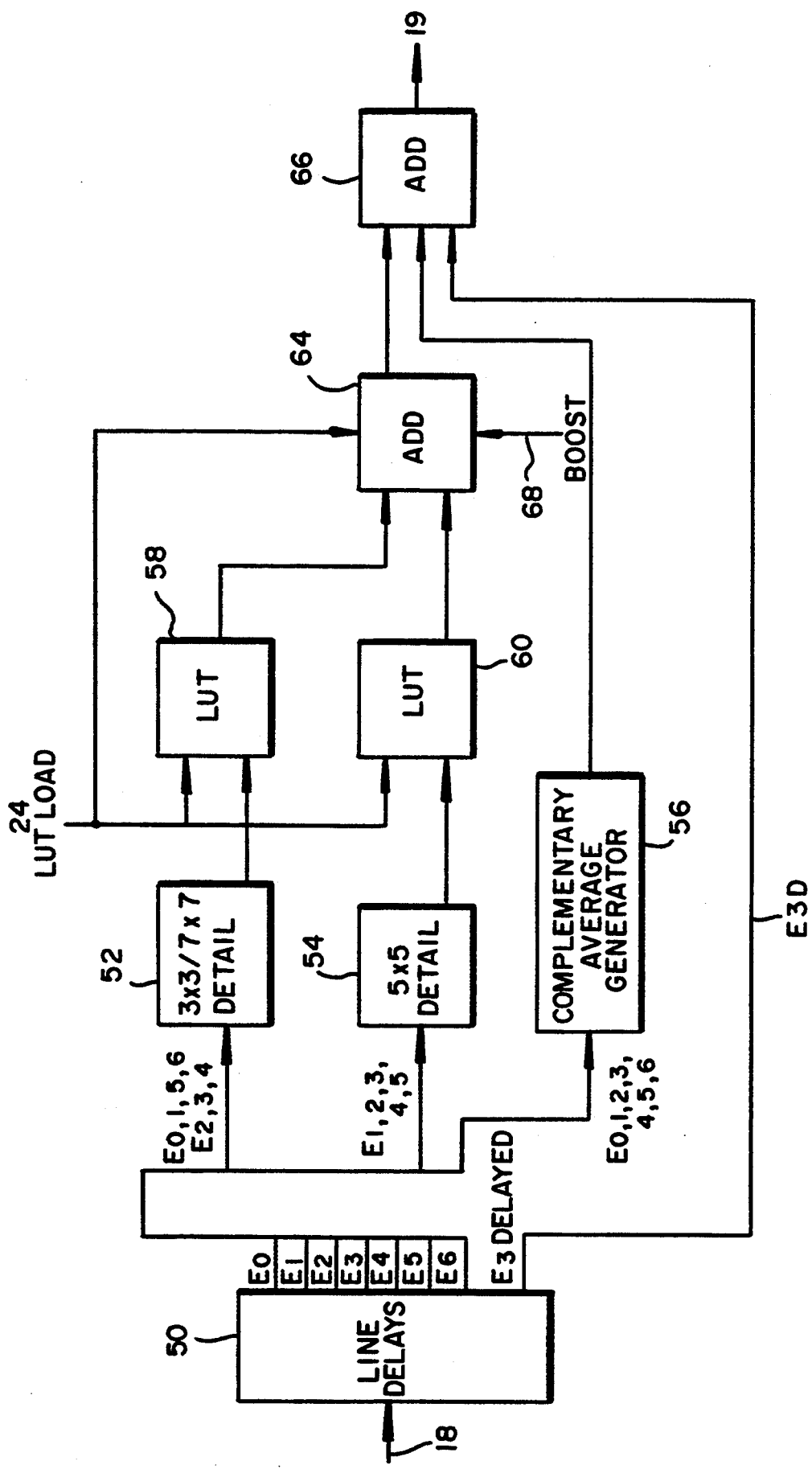
FIG. 3 is a hardware design of a tracked enhancement section as shown in FIG. 2.

Within the telecine application, spatial interpolation may be required with a minimum zoom ratio of approximately 0.375 (corresponding to HDTV to 525 line down-conversion) and a maximum zoom ratio greater than 1.0. At any particular zoom ratio, only two of the three filters are employed; filters 'B' and 'C' for zoom ratios less than 0.5, and filters 'A' and 'B' for zoom ratios greater than or equal to 0.5 (i.e., a gain of zero could be applied to the filter section not in use, or the filter may be re-configured to be either the 'A' or 'C' filter, as required). The preferred implementation of this invention follows the design approach of FIG. 2; that is, the two selected filters are applied to the image signal in parallel, and the output signals multiplied, in the gain stages 34a, 34b, 34c, by gain factors calculated as follows for a given zoom ratio (r):

For $0.375 < r < 0.5$,
$\text{Gain}(B)_{5 \times 5} = 4.0 (5.69r - 1.8445)$ (4)
$\text{Gain}(C)_{7 \times 7} = 5.277 (1.0 - (5.69r - 1.8445))$
For $0.5 < r < 1.0$,
$\text{Gain}(A)_{3 \times 3} = -5r^2 + 9.516r - 3.52$ (5)
$\text{Gain}(B)_{5 \times 5} = 4.0 (-1.6r + 1.8)$
For $1.0 < r < 1.125$,
$\text{Gain}(A)_{3 \times 3} = 1.0$ (6)
$\text{Gain}(B)_{5 \times 5} = 4.0 (-1.6r + 1.8)$
For $r > 1.125$,
$\text{Gain}(A)_{3 \times 3} = 1.0$ (7)
$\text{Gain}(B)_{5 \times 5} = 0.0$ A hardware implementation of the invention is illustrated in FIG. 3, comprising a block 50 of Line delays, detail extract (bandpass) filters 52, 54, a complementary average generator 56, look-up tables (LUTs) 58, 60, and output adders 64 and 66. The complementary average generator 56 provides a smoothed signal over several lines that is complementary to the color signal. The delay block 50 delays the input data by up to six lines, E0 to E6, where E0 is the undelayed data and E6 is the data delayed by six lines. E3 delayed (E3D) is thus the delayed center line. A complementary detail signal is generated in the second adder 66, by subtraction of the complementary average signal from the delayed center line (E3D) signal.

The detail extract filters 52, 54 use the appropriately delayed data as shown in FIG. 3. The filter 52 is switched between the 3×3 filtered output (using filter coefficients A) and the 7×7 filtered output (using filter coefficients C). The filter 54 generates only the 5×5 output (using filter coefficients B). The two detail output signals are applied to the two LUTs 58, 60 before being summed by the adder 64. The proportions (gains) of the two detail signals may be set either by using the LUTs 58, 60, or by scaling the inputs to the adder 64, or by a combination of the two methods. It is also possible to rescale the output of the detail filters 52, 54. Whichever method is used the proportions are programmed by controller 24 with the appropriate gain characteristic as determined for each zoom ratio according to the appropriate gain relationships (4), (5), (6), or (7). Alternatively, two LUTs may be used in each bandpass detail signal path so that one may be loaded while the other is read; in this way the zoom ratio may be varied on a frame-to-frame basis with no disruption of the output data. The signals from the output adder 64 may be set by a "boost" control input 68 to give the desired overall level of enhancement. Finally, the combined detail signal is added in the output adder 66 to the complementary detail signal to provide a complete detail signal with tracked enhancement for input to the adder 19 (FIG. 1) prior to the spatial interpolator 20. While a non-linear noise suppression process is not shown in FIG. 3, it may be obtained by addition of conventional non-linear elements in each of the bandpass signal channels.

While many well-known techniques may be used to implement the detail extract filters 52, 54 in the digital domain, the principles and circuits outlined in Ser. No. 889,578, "Shift and Add Digital Signal Processor", in the name of R. A. Sharman, are employed in the present invention. Ser. No. 889,578 was filed May 28, 1992 and is assigned to the assignee of the present invention. In the shift and add signal processor, digital image data is delayed, shifted in significance, and added to build up "powers of two" filter functions. FIG. 7 shows a diagram of the basic elements of a unit processor 70 as described in Ser. No. 889,578. Mode lines are used to select an input configuration of pixels, the number of pixels of delay, the data bit shift, and an output rescale coefficient. In particular, the input select mode line a and the delay mode lines b program the processor to one of three basic filter configurations:

(1) a horizontal filter using a single input and a plurality of pixel delays;
(2) a vertical filter using an appropriate number of inputs and at least one line delay; and
(3) an "X" type filter using a combination of line delays and pixel delays.

The shifts input on the scale mode lines c determine the coefficients, and therefore the nature of the filter, i.e., high pass, low pass, bandpass, etc.

The processing unit 70 of FIG. 7 comprises two processing sections 71 and 72. In processing section 71, a time series of digital signals are input through line $A_{IN}$ to a latch 73, which is clocked (clock not shown) to provide at least a one-clock delay and to set the timing of the input data to a known reference point. The output of the latch 73 is routed to a channel selector 74, a delay 75, and an input selector 76. The delay 75 may be programmed by the delay mode line b to a variable number of clocks of delay corresponding to discrete pixel delays of between 0 and 8 elements. The channel selector 74 may be programmed by a switch mode line d to set all zeros at its output or to connect its input straight through to its output without change. The outputs of the channel selector 74 and the delay 75 are applied to the two inputs of an adder 77 and the output of the adder 77 is then bit-shifted in a scaler 78. The scaler 78 applies a conventional bit-shifting arithmetic operation, in which the number of bits of right shift are set by the scale mode line ("Z" being a zero output condition). Bits of right-shift correspond to "powers of two" division for positive filter coefficients and bits of right shift followed by complementing correspond to "powers of two" division for negative filter coefficients (i.e., shifts of 0, 1, 2, or 3 provide division by 1, 2, 4, or 8, or, with complementing, division by $-1$, $-2$, $-4$, or $-8$).

The input selector 76 is programmed by the input select mode line a to select either data from the latch 73 or data input through the line $B_{IN}$. In practice, data from the latch 73 is a continuation of the same dimension data, while data input through the line $B_{IN}$ is delayed sufficiently with respect to the signals input to the latch 10 as to represent a second dimension (line) of data. If the input selector 76 is programmed to route the data from the latch 73 through to a latch 79 in the processing section 72, then it can be seen that the data at the output of the latch 79 is one clock period (or, for image data, one pixel) later than the data at the output of the latch 73. In a configuration generally similar to the processing section 71, the output of the latch 79 in processing section 72 is routed through channel selector 80 and a delay 81 to an adder 82. The adder output is then scaled by a scaler 83. The amount of delay for one input to the adder 82, between 0 and 8 pixel elements, is programmed by the delay mode line b to the delay 81. The other input to the adder 82 is programmed by the switch mode line d to the channel selector 80 to be either all zeros or to be the input to the selector 80. The value of the arithmetic operation performed upon the output of the adder 82 is controlled by the shift input on the scale mode line c to the scaler 83. Depending upon the scale mode, the scaler either shifts up to three bits (or no shift), or has a zero (Z) output. The respective outputs of the scalers 78 and 83 are applied to respective latches 84 and 85 to restore the data timing. An adder 86 then combines the scaled values from the sections 71 and 72 into a single output sum signal.

In one example of operation upon three pixels as illustrated in FIG. 8A (selected pixels are symbolized by "x"), the delay 75 is set to two pixels and the channel selector 74 is set to pass its input through without change. The output of the adder 77 then will be the sum of pixel (0) and pixel ($-2$). If the input selector 76 is set to select data from the latch 73, the channel selector 80 is set to zero output, and the delay 81 is set to zero delay, then the output of the adder 82 will be pixel ($-1$). This is due to the one pixel delay in the latch 79. The outputs of the adders 77 and 82 are then scaled by scalers 78 and 83 and latched in latches 84 and 85 to restore the data timing. The scalers 78 and 83 can be set to the zero output condition (Z), or to divide by 1, 2, 4, or 8 by right bit shifting, or to divide by −1, −2, −4, or −8 by right bit shifting and complementing for negative filter coefficients. More specifically, if the scaler 78 is set to "2" then its output will be the addition of pixel (0) and pixel (−2) divided by two. If scaler 83 is set to "1", then its output will be pixel (−1) with no scaling. These scale settings provide (from the adder 86) a low pass output having a weighting function of 0.5, 1.0, 0.5 upon any set of three pixels, that is, the sum of pixel (0) and pixel (−2) divided by two plus pixel (−1). If the scale factor of the scaler 78 were set to −2, then adder 86 would provide a high pass output having a weighting function of −0.5, 1.0, −0.5, and so on.

One feature of the shift and add processor is the flexibility provided by enabling the selector 76 to select either the output of the latch 73 or the input on the line $B_{IN}$. If the input selector 76 is set to select the input $B_{IN}$ and the data at $B_{IN}$ is one video line later than that at $A_{IN}$, a vertical average of the image data will be obtained. (The line delay will ordinarily be obtained by a one-line delay element, not shown, arranged to precede the $B_{IN}$ input to the input selector 76; a conventional delay line or a memory-based line delay may be used.) More specifically, if the delays 75 and 81 are set to zero delay, the channel selectors 74 and 80 are set to provide zero output, and the scalers 78 and 83 are set to divide by two, a purely vertical average of the two pixels shown in FIG. 8B will be obtained. If the delays 75 and 81 are set to a two pixel delay and the channel selectors 12 and 24 are set to pass their input straight through, then the output of the adder 86 will be a four-pixel area average of pixels (0) and (−2) from line (0) and pixels (0) and (−2) from line (1) (as shown in FIG. 8C).

FIG. 7 also shows a cascaded arrangement of unit processor 70 with one or more additional unit processors 70' for carrying out larger filter implementations, including "X" type filters over larger pixel areas using a combination of external line delays and internal pixel delays. The basic functions of the elements of the unit processor 70 are duplicated in the functions of the additional unit processor 70', with the addition of an input selector 87 for selecting either the output of the latch 79 in processor 70 or the input on the line $C_{IN}$ (input selector 88 likewise can optionally select the input on line $D_{IN}$ and input selector 89 can select the input on line $E_{IN}$). In operation, the cascaded filter processor of FIG. 7 may be configured to carry out various functions as described in detail in copending Ser. No. 889,578, including, for example, a nine-pixel average along a line shown in FIG. 8D, or a 5×5 "X" type matrix average over a block of pixels as shown in FIG. 8E, or a 3×3 "X" type matrix as shown in FIG. 8F.

The technique of enhancement according to the invention provides a series of digital bandpass filters with peak amplitude at a continuously variable frequency, appropriate for use in a sequence of image signals which is subject to dynamic or static zoom, or on a static image subject to spatial interpolation. In general, the technique involves the following:

(1) A small number of bandpass filters are designed, with maximum amplitude at differing peak frequencies within a predefined range. These bandpass filters may be designed directly in either the spatial or frequency domains, or may be generated indirectly, for example by calculating the difference between low-pass filters of different cut-off frequency. In the latter case the low-pass filters may be defined by sampled Gaussian or other shaped windows, or may be designed by an optimization routine, for example the Remez Exchange Algorithm (Rabiner & Gold, as above, pp. 136–40);

(2) A derived digital filter characteristic is achieved by applying some or all of the designed filter set, in parallel, to the image signal. Each resulting signal may have a non-linear operation applied to it for the purpose of noise suppression. The resulting image signals are then added together in proportions designed such that the derived filter characteristic has a peak amplitude at a spatial frequency which is a function of the zoom ratio. The proportioned signals are then added to the original signals, or to a low-pass or to a high-pass version of the original signal, depending on the application. This technique has been outlined in FIGS. 2 and 3;

(3) Alternatively, a single digital filter is derived by means of a normalized combination of some or all of the designed filter set, in proportions calculated such that the derived filter has a peak amplitude at a normalized frequency which is a function of the zoom ratio. This single filter is then applied to the image signal, and the output signal multiplied by a predefined enhancement factor. The resulting signal, which may have a non-linear operation applied to it for the purposes of noise suppression, is added to the original image signal, or a low-pass or a high-pass filtered version of this signal. This process is outlined in FIG. 4.

Figure 4:
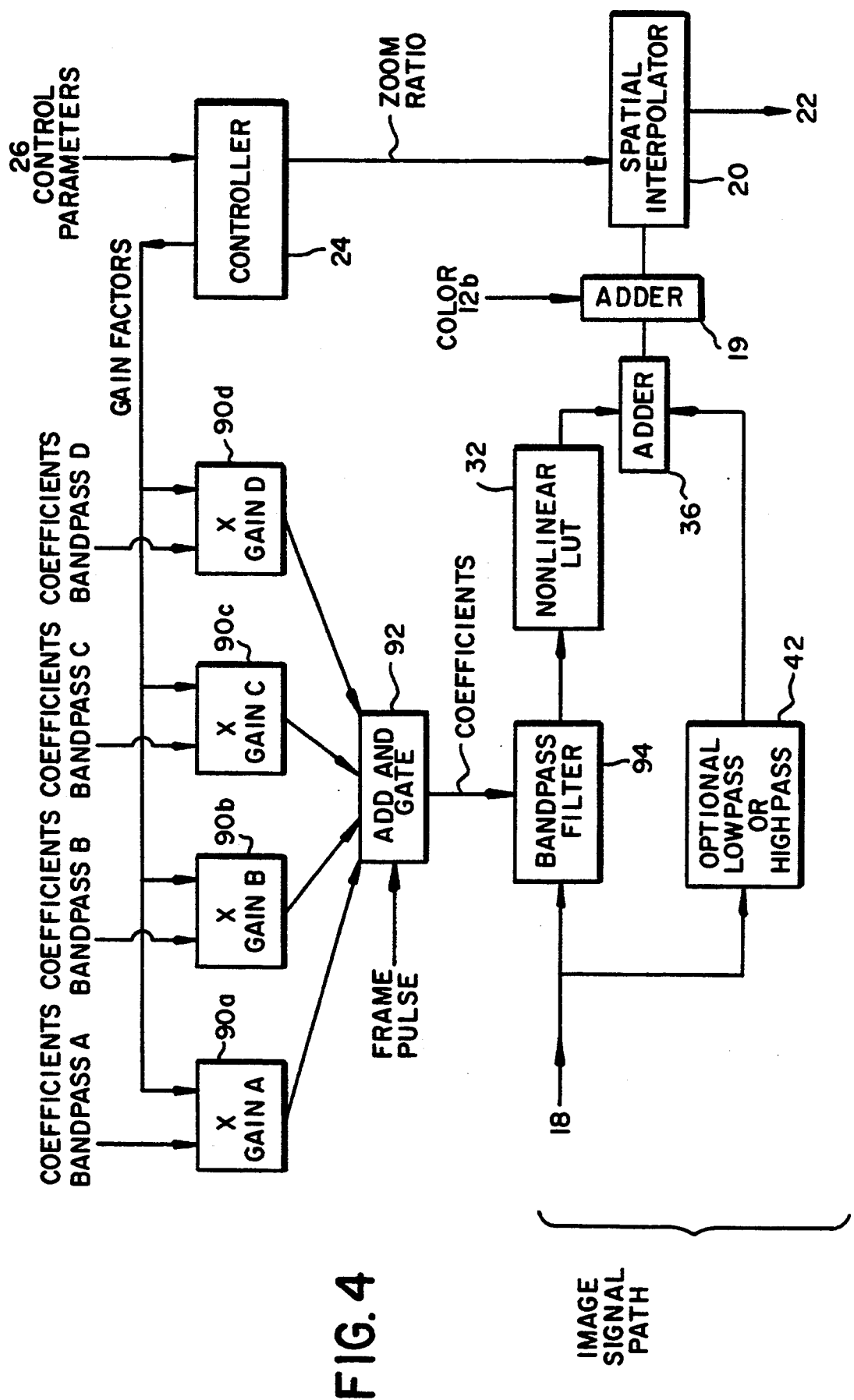
FIG. 4 is a block diagram of a second embodiment of the tracked enhancement section shown in FIG. 1.

In FIG. 4, respective bandpass filter coefficient sets A, B, C, D are multiplied by gain factors A, B, C, D in multiplier sections 90a, 90b, 90c, 90d to obtain proportioned filter coefficients. In the example used heretofore the bandpass coefficient sets (three used only) correspond to the "X" shaped filter configurations for filters A, B, C shown in matrices (1), (2), and (3), and the gain factors A, B, C (three used only) correspond to the gain equations shown in the relationships (4), (5), (6), and (7). The derived filter is obtained by adding the proportioned coefficients in an adder 92, and by applying the summed coefficients to the taps of a bandpass filter 93. The other elements of FIG. 4 function as described in FIG. 2, and are numbered accordingly.

FIG. 4 also illustrates an application that includes dynamic zoom, in that a frame pulse is input to the adder 92, which also incorporates a gate, in order to change the frequency characteristics of the enhancement filter for successive fields in an image sequence. Within a television application, for example, it will be necessary to calculate the required enhancement filter within the field blanking period. This means that new gain factors are output from the controller 24 for each image field, and are used to proportion the bandpass filter matrices A, B, and C on a field-by-field basis.

The invention has been described in detail with particular reference to a presently preferred embodiment, but it will be understood that variations and modifications can be effected within the spirit and scope of the invention.

What is claimed is:

1. Apparatus for enhancing the sharpness of an image signal subject to a zooming process that changes the spatial frequency of the image signal, said apparatus comprising:

means for generating the image signal;

means for generating a control signal indicative of the amount of zoom performed on the image signal;

means for enhancing the image signal, said enhancing means operative within a primary pass-band derived from a plurality of different pass-bands each responsive to a gain adjustment; and means responsive to the control signal for adjusting the gain applied to the different pass-bands according to a predetermined function of the amount of zoom performed on the image signal, whereby the primary pass-band of said enhancing means tracks changes in the spatial frequency of the image signal due to the zooming process.

2. Apparatus as claimed in claim 1 wherein said enhancing means comprises a plurality of bandpass filters, each operative within one of said different pass-bands, and an adder for summing the filtered signals provided by the bandpass filters to obtain the filtered output of the primary pass-band.

3. Apparatus as claimed in claim 2 wherein said enhancing means includes a plurality of non-linear processors, each operative on the filtered signal within one of the pass-bands, for providing a plurality of enhanced signals.

4. Apparatus as claimed in claim 1 wherein said enhancing means comprises a plurality of filter coefficient sets corresponding to each of said different pass-bands, a plurality of multipliers each responsive to the gain adjustment for proportioning the coefficient sets according to the amount of gain applied to each set, and an adder for summing the proportioned coefficient sets to derive a primary coefficient set for the primary pass-band.

5. Apparatus as claimed in claim 4 wherein said enhancing means includes a bandpass filter utilizing the primary coefficient set to generate a filtered signal within the primary pass-band.

6. Apparatus as claimed in claim 5 wherein said enhancing means includes a non-linear processor operative upon the filtered signal within the primary pass-band for providing an enhanced signal.

7. Apparatus for filtering a digital image signal subject to a zooming process that changes the spatial frequency of the digital image signal, said apparatus comprising:

means for generating the digital image signal;

means for generating a ratio signal indicative of the amount of zoom performed on the image signal;

filtering means for processing the digital image signal to enhance the digital image signal, said filtering means having a primary bandpass characteristic derived from a predetermined combination of a plurality of secondary bandpass filter sections, each operative upon the digital image signal and each responsive to a gain adjustment;

means responsive to said ratio signal for adjusting the gain applied to said bandpass filter sections to thereby effect said predetermined combination, whereby the pass-band of said filtering means tracks changes in the spatial frequency of the digital image signal due to zooming.

8. Apparatus as claimed in claim 7 wherein said filtering means comprises a digital filter responsive to a discrete array of image signals.

9. Apparatus as claimed in claim 8 wherein said bandpass filter sections comprise a plurality of digital bandpass filters each responsive to a different two-dimensional array of image signals.

10. Apparatus as claimed in claim 9 wherein the frequency response of each digital bandpass filter is determined by a set of filter coefficients arranged in an "X" over the two-dimensional array of image signals.

11. Apparatus as claimed in claim 10 further including non-linear processing means for generating an enhanced image signal from the output of the bandpass filter sections.

12. Apparatus as claimed in claim 11 wherein said non-linear processing means comprises a plurality of non-linear processors, each operative on the output of a bandpass filter section.

13. Apparatus as claimed in claim 7 wherein said filtering means includes means for summing the filtered output of the bandpass filter sections in order to obtain a filtered signal having the primary bandpass characteristic.

14. Method for enhancing the sharpness of an image signal subject to a zooming process that changes the spatial frequency of the image signal, said method comprising the steps of:

generating the image signal;

generating a control signal indicative of the amount of zoom performed on the image signal;

providing a plurality of bandpass filters having different pass-bands;

proportioning the response of each of the bandpass filters in response to the magnitude of the control signal; and summing the proportioned response of each of the bandpass filters to thereby form a composite bandpass filter having a band edge that tracks changes in the spatial frequency of the image signal due to the zooming process.

15. The method as claimed in claim 14 wherein the step of proportioning the response comprises adjusting the gain applied to each of the filters.

* * * * *